Dec. 13, 1949 L. J. ROUSSEAU 2,490,921
VEHICLE WHEEL WASHING APPARATUS
Filed March 27, 1948 3 Sheets-Sheet 1

INVENTOR.
Leo J. Rousseau
BY Barthel & Bugbee
ATTYS

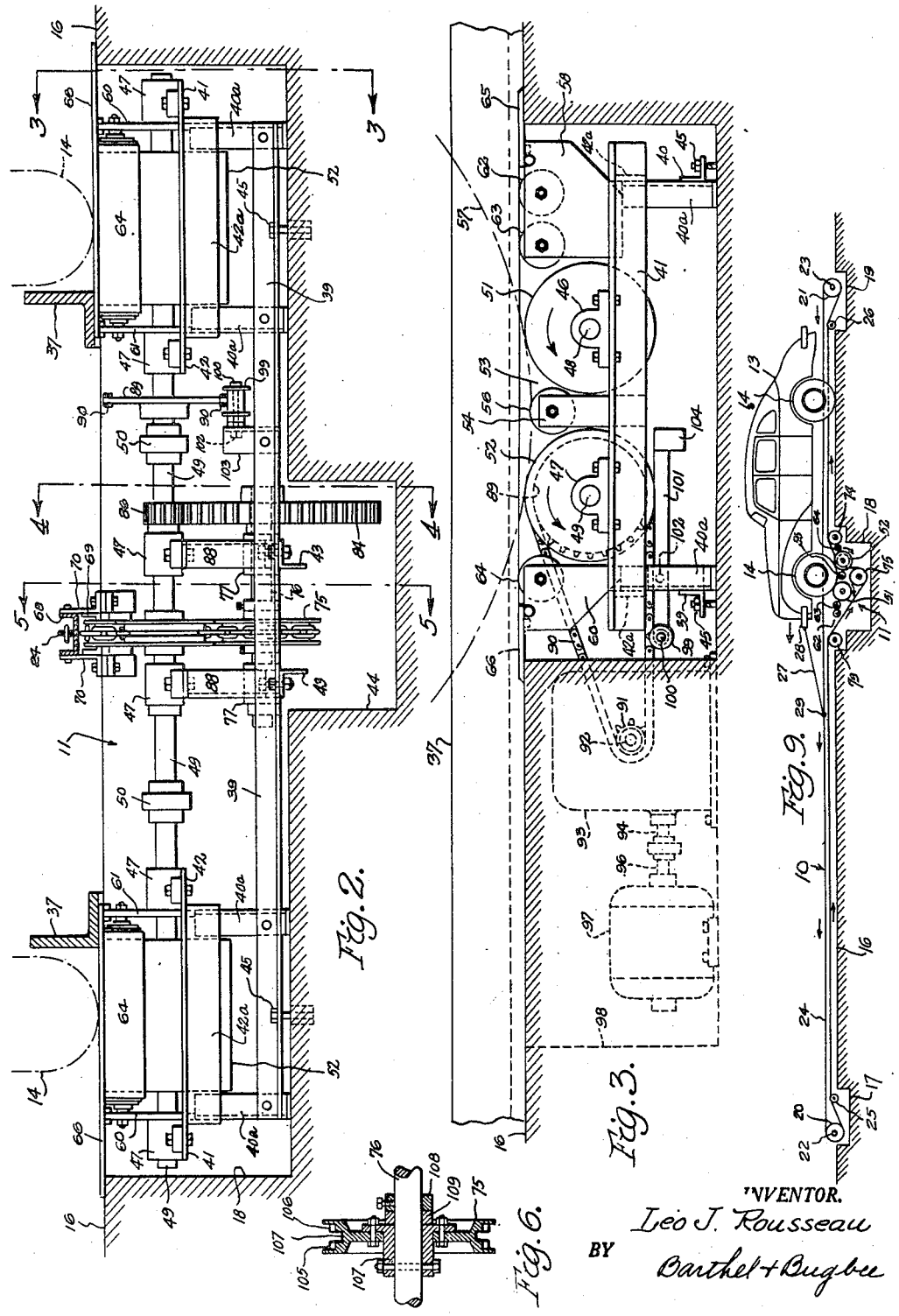

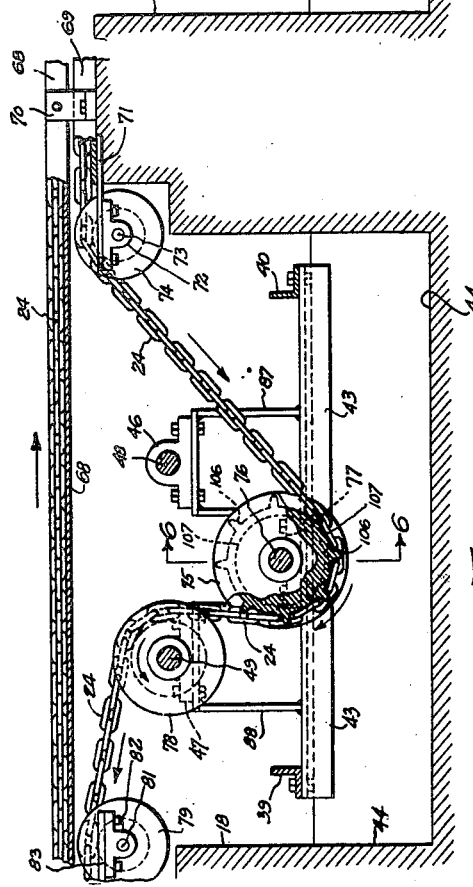

Patented Dec. 13, 1949

2,490,921

UNITED STATES PATENT OFFICE 2,490,921

VEHICLE WHEEL WASHING APPARATUS

Leo J. Rousseau, Grosse Pointe, Mich., assignor to Minit-Man, Inc., Detroit, Mich., a corporation of Michigan Application March 27, 1948, Serial No. 17,513

3 Claims. (Cl. 214—1)

1

This invention relates to vehicle cleaning machines and, in particular, to vehicle washing machines.

One object of the invention is to provide an improved machine for washing the wheels of a vehicle as it is passing through a vehicle washing apparatus.

Another object is to provide improved mechanism for speeding up the rotation of vehicle wheels while the vehicle is passing through a vehicle washing apparatus and being subjected to the action of cleaning elements, such as brushes, so that the wheels will more fully be cleaned than if the wheels received only their normal rotation while passing through the machine.

Another object is to provide an improved machine for speeding up the rotation of vehicle wheels and at the same time providing a hollow into which the wheel momentarily drops while being subjected to the speeding up action, so that the vehicle momentarily halts while the vehicle wheel is being washed.

Another object is to provide an improved machine for speeding up the rotation of vehicle wheels which is mechanically connected to an endless conveyor adapted to pull the vehicle through the vehicle cleaning apparatus, provision being made, if desired, for driving the conveyor chain or cable with the same motor that drives the wheel speed-up machine.

Another object is to provide an improved machine for speeding up the rotation of vehicle wheels, which machine is free from endless belts of the treadmill type, eliminating the consequent defects and frequent need for repairs of such belts.

In the drawings:

Figure 2 is a vertical section taken along the line 2—2 in Figure 1;

Figure 3 is a vertical section, mainly in the side elevation taken along the line 3—3 in Figure 2;

Figure 4 is a vertical section taken along the line 4—4 in Figure 2;

Figure 5 is a vertical section taken along the line 5—5 in Figure 2;

Figure 6 is a fragmentary vertical section, taken along the line 6—6 in Figure 5;

Figure 7 is a diagrammatic side elevation, partly in vertical section, of the vehicle wheel speed-up machine in the operation of washing the front wheels of a vehicle;

Figure 8 is a diagrammatic front elevation,

Figure 1:
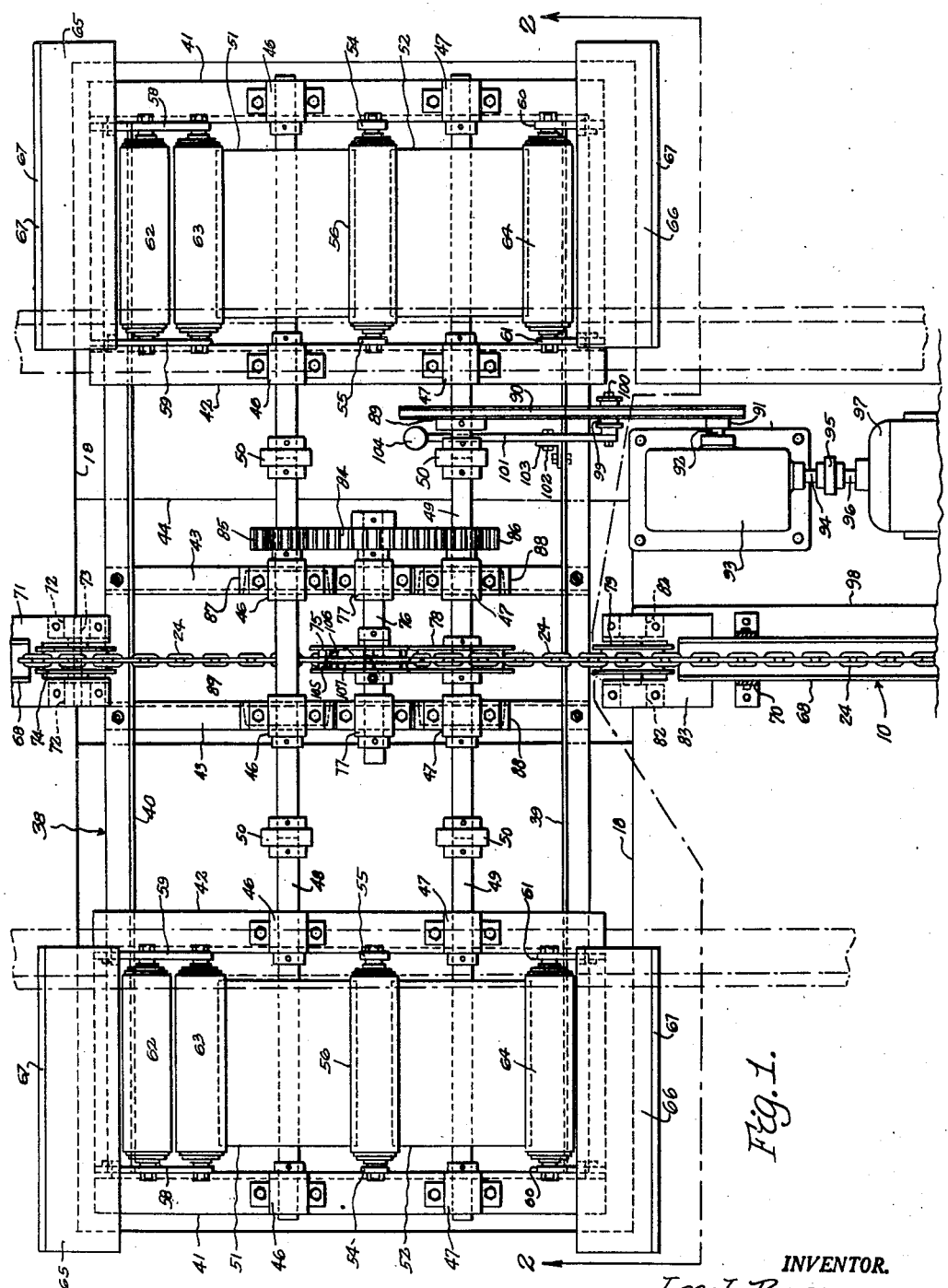
Figure 1 is a top plan view of vehicle wheel speed-up machine, according to a preferred form of the invention.

2 partly in vertical section, of the vehicle washing apparatus of Figure 7 in operation; and Figure 9 is a diagrammatic side elevation, partly in vertical longitudinal section, of a vehicle conveying and wheel speed-up system of the type shown in Figures 1 to 5 inclusive.

Referring to the drawings in detail, Figures 1 to 5 inclusive and 9 show a vehicle conveyor, generally designated 10 drivingly connected to a vehicle wheel speed-up machine generally designated 11 according to a preferred form of the invention, adapted to convey a vehicle 13 through a vehicle-washing and drying apparatus (not shown) while subjecting the wheels 14 to the action of wheel-washing brush devices 15 (Figure 8). The vehicle washing apparatus is conventional and it, together with the wheel-washing brush devices 15 may be of the types shown in my co-pending application Serial No. 547,837 filed August 3, 1944 for a Motor-vehicle cleaning apparatus.

The vehicle-washing apparatus is mounted on a floor 16 (Figure 9) having pits 17, 18 and 19 spaced at intervals along the route traveled by the vehicle 13 on its way through the vehicle-washing and drying machine. The pits 17 and 19 are provided with sprockets 20 and 21 mounted on shafts 22 and 23 at the opposite ends of the endless conveyor 10 and encircled by the endless conveying element or chain 24. The conveyor element 24 may pass over idler sprockets or pulleys 25 and 26 in order to place its forward and return portions closely adjacent one another.

The vehicle 13 itself is towed by a flexible element 27 such as a chain attached at its rearward end to a portion of the vehicle, such as its bumper 28, and at its forward end by a connector 29 to the chain 24. The connector 29 may consist of the quick-detachable coupling device shown in my co-pending application Serial No. 16,990 filed March 25, 1948 for a Quick-acting clamp. In this manner, the vehicle 13 is detachably connected to the forward course of the conveyor chain 24 adjacent the rearward sprocket 21 and is detached therefrom by an attendant when the connector 29 approaches the forward sprocket 20.

The vehicle wheel speed-up machine 11 is mounted in the pit 18 for momentarily speeding up the rotation of the vehicle wheels 14 as they pass over the pit 18 while the vehicle 13 is being subjected to the action of the wheel-washing brush devices 15. The latter may consist of rotary brushes 30 (Figures 7 and 8) mounted on vertical shafts 31 journaled in approximately horizontal arms 32 and 33 which in turn are pivoted as at 34 and 35 to uprights 36 placed alongside the vehicle pathway defined by the track members 37. The track members 37 may consist of angle irons or rails mounted lengthwise along the floor 16 on opposite sides of the conveyor chain 24 at spacings sufficient to place them just inside the vehicle wheels 14 (Figure 8). The brush shafts 31 are driven by motors (not shown) and the arms 30 and 32 are preferably inclined slightly so that a line through the pivots 34 and 35 is tilted slightly toward the vehicle 13. By this arrangement, the force of gravity causes the brush arms 32 and 33 to swing inward, bringing the brushes 30 into engagement with the faces of the wheels 14.

The vehicle wheel speed-up machine 11 momentarily rotates the vehicle wheels 14 more rapidly than the normal rotation which they would receive as the vehicle 13 is pulled along the floor 16 by the conveyor 10. If this speed-up machine were not provided, only an incomplete sector of the face of each wheel 14 would be reached by the brushes 30 as the vehicle 13 moved past them. The speed-up machine 11 is mounted upon a frame 38 consisting of a pair of cross-members 39 and 40 supported on legs 40a and interconnected by spaced outer and inner longitudinal members 41 and 42 interconnected by end members 42a and spaced central longitudinal frame members 43. The frame 38 is mounted in the pit 18, which is provided with a sub-pit 44 extending downwardly from the bottom thereof, and held in position by hold-down bolts 45.

Mounted on the frame members 41, 42 and 43 (Figure 1) are spaced sets of shaft hangers or bearing blocks 46 and 47 in which are journalled parallel shafts 48 and 49 having separate sections thereof interconnected by couplings 50. Mounted on the shafts 48 and 49 between the frame members 41 and 42 are forward and rearward rollers or pulleys 51 and 52 respectively (Figure 3) of approximately the same size and separated a sufficient amount to provide a hollow or depression 53 between each pair of rollers 51 and 52. A pair of brackets 54 and 55 extend upward from the outer and inner frame members 41 and 42 and serve to rotatably support small diameter idler rollers 56 of diameters such that their upper peripheral portions lie on a level below the level of the floor 16. The upper peripheries of the rollers 51, 56 and 52 are also so located and proportioned as to lie along an arc 57 (Figure 3) which is approximately the diameter of an average vehicle tire. Outer and inner forward plates 58 and 59 and rearward plates 60 and 61 (Figures 1 and 2) also are mounted upon and extend upward from the outer and inner frame members 41 and 42. The forward plates 58 and 59 serve to rotatably support pairs of forward idler rollers 62 and 63 whereas the rearward plates 60 and 61 similarly rotatably support single rearward idler rollers 64. The forward and rearward plates 58, 59 and 60, 61 are interconnected by horizontal forward and rearward plates 65 and 66 respectively, the edges of which are beveled as at 67.

The conveyor chain 24 in its forward and rearward courses runs in upper and lower channel members 68 and 69 respectively (Figure 5) supported at intervals by angle brackets 70. Arranged adjacent the forward edge of the pit 18 is a notched plate 71 (Figure 1) to the rearwardly-projecting arms of which are bolted bearing blocks 72 in which are journaled the opposite ends of an axle 73 carrying a grooved pulley 74 (Figure 5) over which passes the return course of the conveyor chain 24. Rearward of the pulley 74 the conveyor chain 24 descends at an angle so as to pass around the underside of a sprocket 75 mounted on a shaft 76, the opposite ends of which are journaled in bearing blocks 77 bolted to the frame members 43 (Figure 1). From the sprocket 75 the chain 24 descends vertically to pass around a grooved pulley 78 mounted upon the shaft 49 (Figures 1 and 5) from whence it passes over the top of a grooved pulley 79. The latter is mounted upon an axle 81 journaled in bearing blocks 82 bolted to a forwardly-extending notched plate 83 similar to the notched plate 71 and similarly secured to the floor 16 adjacent the edge of the pit 18.

Also mounted upon the shaft 76 (Figures 1, 2 and 4) is a large bull gear 84 which meshes with pinions 85 and 86 mounted upon the shafts 48 and 49 respectively. The bearing blocks 46 and 47 which rotatably support the central portions of the shaft 48 and 49 are mounted upon pillars 87 and 88 respectively (Figures 4 and 5) secured at their lower ends to the frame members 43 and rising therefrom on opposite sides of the bearing blocks 77. Also mounted on the shaft 49 is a sprocket 89 which is drivingly connected by a sprocket chain 90 to a sprocket 91 mounted on the output shaft 92 of a conventional reduction gear set 93, the input shaft 94 of which (Figure 1) is connected by the coupling 95 to the output or armature shaft 96 of an electric motor 97. The reduction gear set 93 and motor 97 are bolted to the bottom of an alcove 98 of the pit 18. In order to take up slack in the sprocket chain 90, there is provided an idler pulley 99 mounted on an axle 100 at one end of a lever 101 which is pivoted as at 102 to the angle bracket 103 (Figure 1) bolted to the frame member 39. The opposite end of the lever 101 carries a counterweight 104 by which upward pressure is applied to the pulley 99 to take up the slack in the sprocket chain 90.

The sprocket 75 is provided with teeth 105 and 106 (Figure 6) separated by an annular groove 107 adapted to receive the vertical links of the conveyor chain 24, the intervals between the vertical and horizontal links being entered by the teeth 105 and 106. The pulley 75 is bolted to a hub 107 which in turn is bolted to the shaft 76. A collar 108 clamped to the shaft 76 and a spacing ring 109 serve to engage the hub 107 on its right-hand end. While the conveyor 10 and vehicle wheel speed-up machine 11 have been shown as driven by a common motor 97, it will be obvious that separate motors may also be used.

*Operation*

In the operation of the invention, after the vehicle has been driven to the rearward end of the floor 16 adjacent the sprocket or pulley 21, the tow chain 27 is secured to the vehicle bumper 28 and coupled as at 29 to the upper or forwardly moving course of the conveyor chain 24. Meanwhile, the motor 97 has been placed in operation, rotating the shafts 48 and 49 and the rollers 51 and 52 of the vehicle wheel speed-up machine 11 in the directions shown by the arrows in Figure 3. At the same time, the rotation of the sprocket 75 by the rotation of the shaft 49 pulls the return course of the conveyor chain 24 downward in the direction of the lower arrows (Figure 5) causing the upper course to travel in the direction of the upper arrow so that a travel of the various portions of the conveyor chain 24 and vehicle 13 occurs as shown in Figure 9.

When the front wheels of the vehicle 14 pass over the rearward plates 66 and rearward idler rollers 64 (Figure 1), they suddenly move downhill, in effect, over the rollers 52 into the hollow or depression 53 so that the peripheries of the tires occupy positions approximately coincident with the arcs 57 (Figure 3). This drop of the tire or wheel 14 into the hollow 53 occurs suddenly, causing a momentary slackening in the tow chain 27. This slackening is sufficient to halt the forward travel of the vehicle 13 momentarily, before this slack is taken up by the steady forward motion of the upper course of the conveyor chain 24. During this momentary halt of the vehicle 13, the speed-up machine 11, applied through the driven rollers 51, 52, rotates the wheels 14 rapidly as they rest in the hollows 53. Meanwhile the rotary brushes 30 move inward into engagement with the wheels 14 and, assisted by water sprays (not shown), wash off the mud and dirt from the wheels. The various speed ratios of the machine 11 are such that the speed-up machine 11 is capable of rotating the wheel 14 through at least a full revolution during its momentary halt in the hollow 53, cleaning the entire outer surface of the wheel. The brushes 30 are of very limp material so that they reach into the various hollows of the wheel and consequently clean it thoroughly.

In the meantime, the forward travel of the upper course of the conveyor chain 24 has been steadily taking up the slack in the tow chain 27 caused by the dropping of the wheel 14 into the hollow 53, and when this slack is entirely taken up, the tow chain 27 becomes taut and causes the vehicle to resume its forward travel. As the vehicle moves forward, it is subjected to the action of other water sprays and body and top cleaning brushes in the manner described in my previously-mentioned co-pending applications. When the rear wheels 14 arrive over the speed-up machine 11, they in turn also drop into the hollows 53 and are speeded up and washed in the previously described manner as the tow chain 27 again becomes momentarily slackened. The vehicle 13 again resumes its forward travel when the slack in the tow chain 27 is taken up, and passes through the drying portions of the machine to the end of its travel adjacent the pulley or sprocket 20. Here the tow chain 27 is uncoupled from the chain 24 and disconnected from the bumper 28, after which the driver drives the vehicle 13 away under its own power.

What I claim is:

1. A vehicle conveyor and wheel speed-up system for vehicle washing apparatus, comprising an endless conveyor movable along a vehicle pathway through said apparatus, a vehicle towing element detachably connecting the vehicle with said conveyor, and a vehicle wheel speed-up machine engageable with the vehicle wheels and having hollows therein for momentarily receiving the wheels whereby to effect a momentary slackening of said towing element and cause a momentary halt in the vehicle travel during the wheel speed-up and washing operation.

2. A vehicle conveyor and wheel speed-up system for vehicle washing apparatus, comprising an endless conveyor movable along a vehicle pathway through said apparatus, a vehicle towing element detachably connecting the vehicle with said conveyor, a vehicle wheel speed-up machine engageable with the vehicle wheels and having hollows therein for momentarily receiving the wheels whereby to effect a momentary slackening of said towing element and cause a momentary halt in the vehicle travel during the wheel speed-up and washing operation, and a common power source drivingly connected to said conveyor and to said speed-up machine.

3. A vehicle conveyor and wheel speed-up system for vehicle washing apparatus, comprising an endless conveyor movable along a vehicle pathway through said apparatus, a vehicle towing element detachably connecting the vehicle with said conveyor, and a vehicle wheel speed-up machine engageable with the vehicle wheels and having hollows therein for momentarily receiving the wheels whereby to effect a momentary slackening of said towing element and cause a momentary halt in the vehicle travel during the wheel speed-up and washing operation, said speed-up machine including rotary wheel-rotating elements spaced apart from one another on the forward and rearward sides of said hollows.

L. J. ROUSSEAU.

REFERENCES CITED

The following references are of record in the file of this patent:

UNITED STATES PATENTS

| Number | Name | Date |
|---|---|---|
| 1,909,969 | Randrup | May 16, 1933 |
| 1,924,005 | Stevens | Aug. 22, 1933 |
| 2,062,600 | Norton | Dec. 1, 1936 |